United States Patent
Hahn et al.

[11] Patent Number: 5,111,546
[45] Date of Patent: * May 12, 1992

[54] DOCK LEVELER LIFT ASSEMBLY AND METHOD FOR OPERATION

[75] Inventors: Norbert Hahn, Franklin, Wis.; Robert W. Naegeli, Edmond, Okla.

[73] Assignee: Rite Hite Corporation, Milwaukee, Wis.

[*] Notice: The portion of the term of this patent subsequent to Feb. 26, 2008 has been disclaimed.

[21] Appl. No.: 613,262

[22] Filed: Nov. 13, 1990

Related U.S. Application Data

[63] Continuation of Ser. No. 411,866, Sep. 25, 1989, Pat. No. 4,995,130.

[51] Int. Cl.⁵ .............................................. E01D 1/00
[52] U.S. Cl. ..................................... 14/71.3; 14/71.7
[58] Field of Search .............. 14/69.5, 71.1, 71.3, 14/71.5, 71.7; 187/1 R, 17, 18, 8.72, 9 R; 254/3 C, 9 C, 10 C, 45, 122; 414/917; 74/521; 108/47

[56] References Cited

U.S. PATENT DOCUMENTS

| | | |
|---|---|---|
| 3,317,004 | 5/1967 | Harrison . |
| 3,373,879 | 3/1968 | Verini . |
| 3,579,696 | 5/1971 | Hecker et al. . |
| 3,583,014 | 6/1971 | Brown et al. . |
| 3,699,601 | 10/1972 | Hecker et al. . |
| 3,728,753 | 4/1973 | Beckwith et al. . |
| 3,905,496 | 9/1975 | Reeder . |
| 4,110,860 | 9/1978 | Neff et al. . |
| 4,221,280 | 9/1980 | Richards . |
| 4,257,137 | 3/1981 | Hipp et al. . |
| 4,319,732 | 3/1982 | Godfrey . |
| 4,394,888 | 7/1983 | Clarke . |
| 4,403,680 | 9/1983 | Hillesheimer . |
| 4,531,248 | 7/1985 | Swessel et al. . |
| 4,570,277 | 2/1986 | Hahn et al. . |
| 4,662,021 | 5/1987 | Hagen et al. . |
| 4,673,328 | 6/1987 | Shiels . |
| 4,744,121 | 5/1988 | Swessel et al. . |
| 4,858,888 | 8/1989 | Cruz et al. . |
| 4,995,130 | 2/1991 | Hahn et al. .......................... 14/71.3 |

FOREIGN PATENT DOCUMENTS 2419900 10/1979 France .
1212112 11/1970 United Kingdom .

OTHER PUBLICATIONS

Leiston Engineering Lift Leveller, Loading Logistics Ltd., Essex, England, Marketing brochure, Jul. 1986.

Primary Examiner—William P. Neuder
Attorney, Agent, or Firm—Leydig, Voit & Mayer

[57] ABSTRACT

A dock leveler lift assembly for facilitating loading and unloading operations from a loading dock is provided. The assembly includes a deck adjustable in a leveler mode between selected raised and lowered angular positions relative to the platform surface of the dock as well as adjustable in a lift mode between lift and descent positions while the deck is maintained in a horizontal position. The deck is releasably mounted on a first mechanism for raising and lowering the deck in a horizontal position. A second mechanism releasably retains a deck rear edge portion pivotally attached to an elevated portion of a frame. Pivotal attachment of the deck to the frame coupled with lowering of the first mechanism out of direct contact with the underside of the deck permits movement of the deck to a lowered angular position relative to the dock surface. A method for operating such an assembly is also provided.

6 Claims, 3 Drawing Sheets

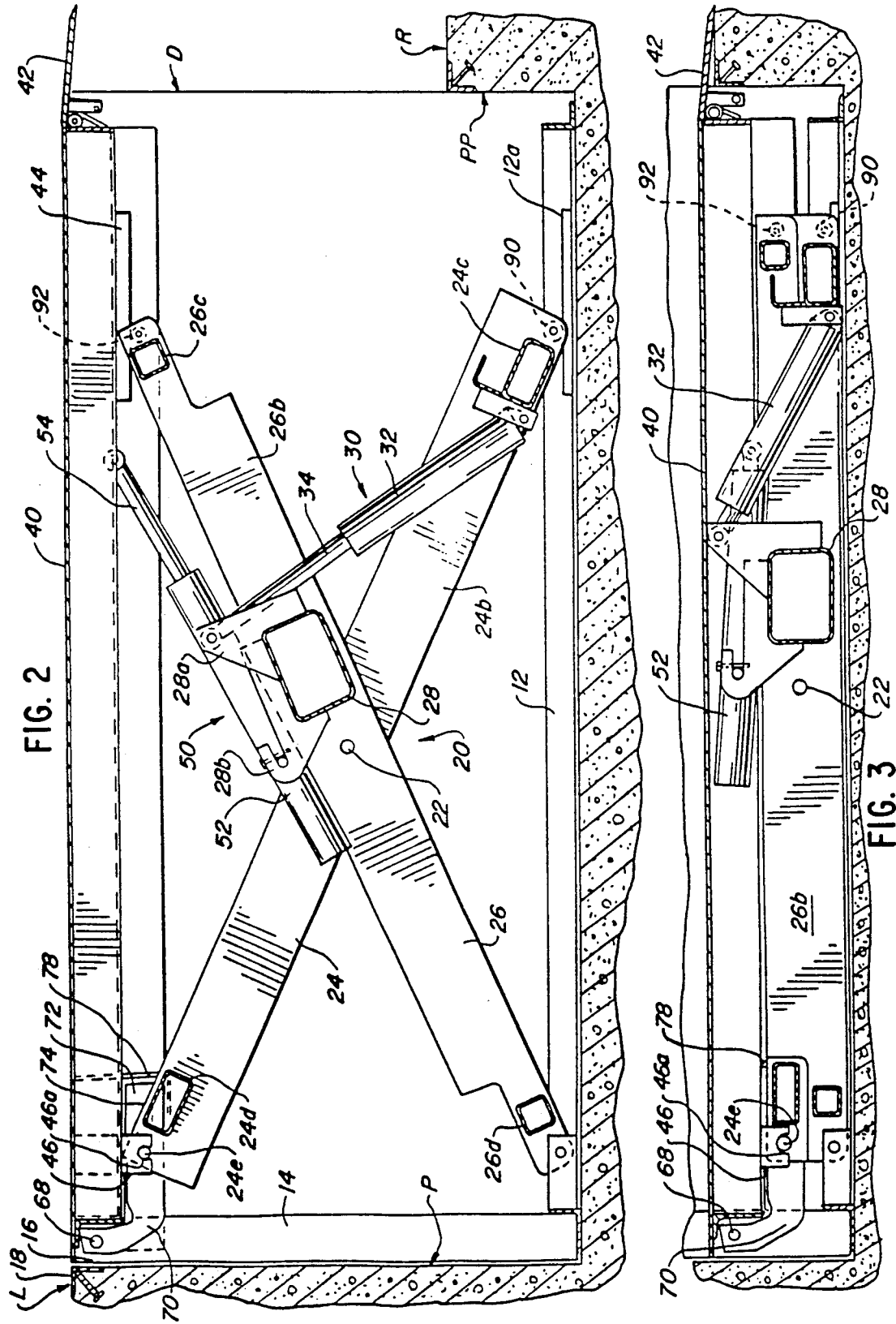

DOCK LEVELER LIFT ASSEMBLY AND METHOD FOR OPERATION

This is a continuation of application Ser. No. 07/411,866, filed Sep. 25, 1989, now U.S. Pat. No. 4,995,130 issued on Feb. 26, 1991.

BACKGROUND OF THE INVENTION

This invention relates generally to an improved loading dock leveler lift assembly which employs a pivotally mounted deck to angularly adjust to the level of variously sized vehicles parked adjacent a loading dock, and a mechanism for adjusting the deck to selected raised and lowered angular positions as well as lift and descent positions while the deck is maintained in a horizontal position. The invention further relates to a method for operation of such an improved dock leveler lift assembly.

Loading dock facilities often employ two types of devices to facilitate loading and unloading of various sized vehicles; namely, dock levelers and dock lifts. Examples of dock levelers are disclosed in U.S. Pat. Nos. 3,583,014, 3,699,601, 3,728,753, 4,110,860, 4,257,137, 4,531,248, 4,570,277 and 4,744,121. Such dock levelers compensate for height variations between the bed of a vehicle parked on a roadway adjacent to the dock and the platfor surface of the dock by employing a deck which is hingedly connected at its rear edge to a frame mounted within a pit formed in the dock and open at the front and top sides. The deck is pivoted between a raised, or upwardly inclined, position above the dock platform surface and a lowered declining position below dock level to allow loading and unloading of vehicles which have beds above or below the platform surface of the dock. An extension plate, or lip, is hinged to the front edge of the deck and is movable to an extended position to bridge the space between the rear edge of the bed of the parked vehicle and the front edge of the deck. Such dock levelers are not designed to be used to transfer personnel and material handling equipment between the loading dock surface to the roadway since the typical height between the dock surface and the roadway provides a slope greater than the slope across which personnel and material handling equipment may safely travel.

Loading docks are also situated where it is sometimes necessary to transfer material between the loading dock surface and the roadway. In such situations materials may be temporarily stored outside the loading dock facility on ground-level storage areas or in separate buildings, or when side loaded vehicles cannot be parked with their side loading surface adjacent the loading dock. Another such situation involves vehicles having low beds which cannot be reached by operation of conventional dock levelers. Some loading dock facilities provide for these circumstances by using dock lifts having vertically adjustable horizontal platforms for raising and lowering personnel and equipment between dock level and the roadway. Other dock facilities utilize a stationary, long, sloping ramp leading from the platform surface of the dock to the roadway.

Dock lifts have heretofore been provided which move vertically while maintaining a horizontal platform surface and also allow adjustment of the platform or deck to an upwardly inclined position relative to a reference level or plane. Two examples of such lifts, called bi-elevational platform lifts, are disclosed in U.S. Pat. Nos. 4,221,280 and 4,394,888. One drawback of such bi-elevational platform lifts is their inability to allow adjustment of the platform to both an upwardly inclined position and a lowered declining position relative to one reference level, such as the surface of the loading dock. Thus, these devices cannot function in the same manner as the conventional dock levelers described above.

It is desirable therefore to provide a single device for facilitating the various loading and unloading operations performed at loading dock facilities and thus remove the need for installing multiple devices which perform a few but not all of the important functions. A method for operating such a single device is also desirable. It is also advantageous to eliminate the need for long stationary ramps leading to the platform surface of the loading dock particularly where space at the loading dock is at a premium.

SUMMARY OF THE INVENTION

Thus, it is a general object of the present invention to provide an improved dock leveler lift assembly which is capable of performing in a facile manner a variety of loading and unloading operations at a single loading dock station.

It is another object of the present invention to provide an improved dock leveler lift assembly having a loading deck or platform which is adjustable both to upwardly inclined and declining angular positions, and to lift and descent positions while maintaining the deck in a horizontal position.

It is a further object of the present invention to provide a method of operation for such an improved dock leveler lift assembly.

Other objects and advantages of the invention will become apparent upon reading the following description and appended claims, and upon reference to the accompanying drawings.

In accordance with one embodiment of the invention, a dock leveler lift assembly is provided having a first means mountable on a base of a frame and movable between a predetermined lowered position, a predetermined vertical lift position, and a predetermined intermediate position. A first actuating means is connected to the first means for selectively raising and lowering the first means. A loading deck or platform is releasably mounted on the first means and movable between a lowered position and a raised position. Hingedly connected to the front edge portion of the deck is a lip plate which is movable between a depending position and an outwardly extended cantilevered position. The dock leveler lift assembly also includes a second means disposed proximate the rear edge of the deck for releasably retaining the deck rear edge portion in a pivotally attached relation with an elevated rear portion of the frame. A second actuating means is mounted on the first means and operatively connected to the loading deck for pivotally moving same between upwardly inclined and lowered declining positions. The lowering of the first means to the predetermined intermediate position permits selective pivotal movement of the deck downward to a lowered declining position after the second means pivotally attaches the deck rear edge portion to an elevated rear portion of the frame. The dock leveler lift assembly may include a safety means for stabilizing the deck on the first means.

The invention also relates to a method of operating an improved dock leveler lift assembly, the latter having a frame; a loading deck adjustable in a leveler mode between upwardly inclined and lowered declining positions relative to a loading dock platform surface and adjustable in a lift mode between a lowered horizontal position and a raised horizontal position; a lip hingedly connected to the front of the deck, and a first means releasably supporting the deck for movement between lowered and raised positions. The method comprises storing the assembly with the loading deck thereof substantially coplanar with the loading dock platform surface, and then selecting either the lift mode or the leveler mode of operation. Upon selection of the lift mode, the assembly is operated by initially adjusting the deck from the stored position to a desired lower level while maintaining the deck in a horizontal position, and then raising the deck to a substantially coplanar position with the loading dock platform surface. Upon selection of the leveler mode, the assembly is operated by pivotally and releasably attaching a rear edge portion of the deck to an elevated rear portion of the frame; lowering the first means to a predetermined intermediate position; pivoting the deck to an upwardly inclined position; extending the lip to a cantilevered position, and then pivoting the deck and cantilevered lip as a unit to a desired position wherein the lip rests upon the rear edge portion of the bed of the vehicle to be loaded or unloaded. Operating the assembly in the lift mode may also include the steps of pivoting the deck to an upwardly inclined position, extending the lip to a cantilevered position, and pivoting the deck downwardly to a horizontal position prior to lowering the deck to a desired level.

DESCRIPTION OF THE INVENTION

For a more complete understanding of the present invention reference should now be made to the accompanying drawings.

FIG. 2 is an enlarged fragmentary side elevational view in partial cross section of the assembly of FIG. 1 showing the loading deck thereof in an elevated position level with the platform surface of a loading dock, a first actuating means for raising and lowering the first means, and a second actuating means for pivoting the loading deck.

FIG. 3 is similar to FIG. 2 but showing the first means in the predetermined lowered position and the horizontally disposed loading deck in a lowered position substantially coplanar with the roadway.

Figure 1:
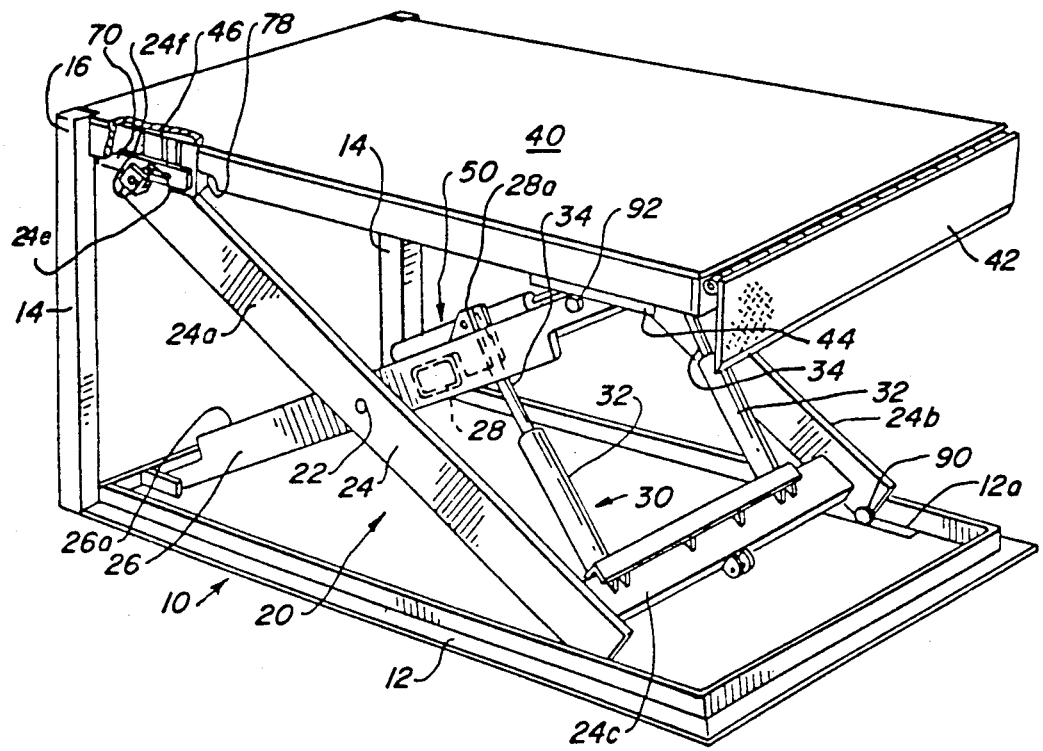
FIG. 1 is a perspective view of one embodiment of the improved dock leveler lift assembly in partial cross section showing various components thereof, including a first means in a predetermined vertical lift position, the loading deck in an elevated position, the lip in a depending position, and a safety means for stabilizing the deck on the first means.
Figure 6:
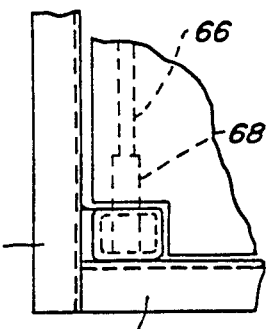
FIG. 6 is a fragmentary top view showing a portion of the second means of FIG. 5 retaining the deck rear edge portion pivotally attached to the upright rear portion of the frame.
Figure 5:
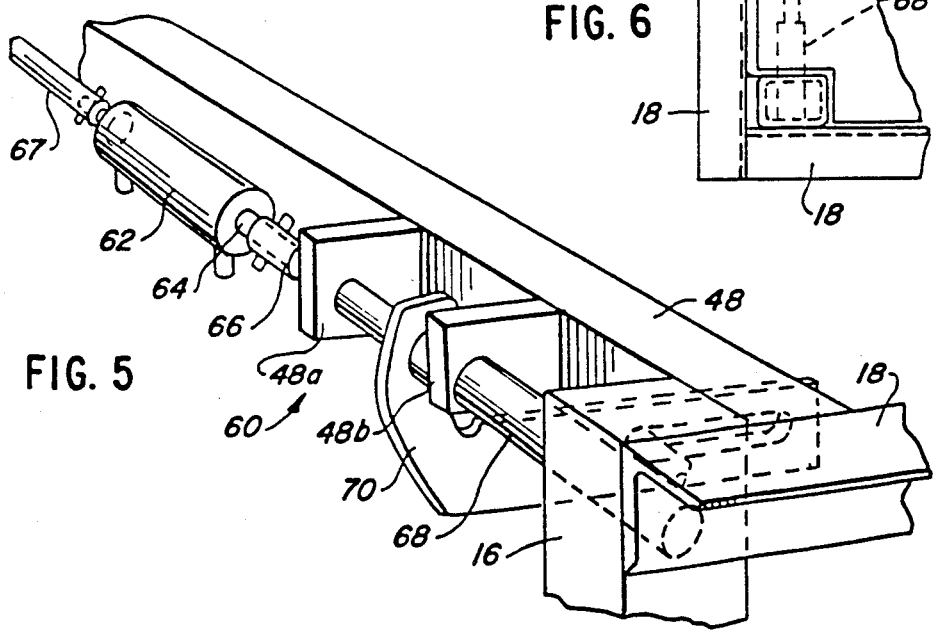
FIG. 5 is an enlarged fragmentary perspective view showing an actuating means disposed near a cross frame member at the rear edge of the loading deck for releasably retaining the deck rear edge portion pivotally attached to the upright rear portion of the frame.

Turning now to the drawings and more particularly FIGS. 1 and 2, a preferred embodiment of the dock leveler lift assembly is shown in a raised or elevated position. The assembly includes a frame 10 having a rectangular base structure 12 mounted within an open top and front pit P, see FIG. 2, in the front wall of a loading dock D. A portion PP of the pit may also be disposed blow the roadway surface R leading to the dock. The frame 10 includes an upright rear portion having two horizontally spaced parallel post-like members 14 disposed adjacent a rear wall of the pit P. Each post-like member 14 has an upper end portion 16 which is disposed adjacent to, but spaced below, the loading dock platform surface L. Edging members 18 are disposed along the top edges of the pit, as shown in FIGS. 2, 5 and 6.

It will be apparent that the upper end portion 16 of the frame 10 may be incorporated in the construction of the pit P, without interconnecting the upper end portion 16 to the base structure 12 by the intervening post-like members 14.

A first means, such as a scissor-acting assembly 20, is movably mounted on the frame base structure 12 and includes first and second frameworks 24 and 26, respectively, which are hinged together to pivot about a centrally located pivot pin 22. Framework 24 includes parallel side members 24a and 24b interconnected by end members 24c and 24d, and framework 26 includes parallel side members 26a and 26b interconnected by end members 26c and 26d. Framework 26 is provided with a cross-frame member 28 disposed near the centrally located pivot pin 22. As shown in FIG. 1, the side members of first framework 24 are positioned outwardly of and to interleave with the second framework side members in a scissor-acting manner about pivot pin 22.

Expansion and contraction of the scissor-acting assembly 20 between the predetermined raised position shown in FIGS. 1 and 2 and the predetermined lowered or closed position shown in FIG. 3 is accomplished in a well understood manner. The rear ends of the second framework side members 26a and 26b are pivotally affixed to the rear of base structure 12. The front ends of the first framework side members 24a and 24b are free and include rollers 90 which slidably engage a pair of opposed fixed ledges 12a forming a part of the frame 12. A first actuating means, such as a pair of hydraulically actuated cylinder and piston mechanisms 30, is used to expand and contract the scissor-acting assembly 20. The cylinders 32 are pivotally connected to the end member 24c of the first framework 24 and the exposed distal ends of the pistons 34 are pivotally connected to brackets 28a affixed to cross-frame member 28. Extension of the pistons 34 raises the assembly 20 while retraction of the pistons 34 lowers the assembly 20.

Figure 4:
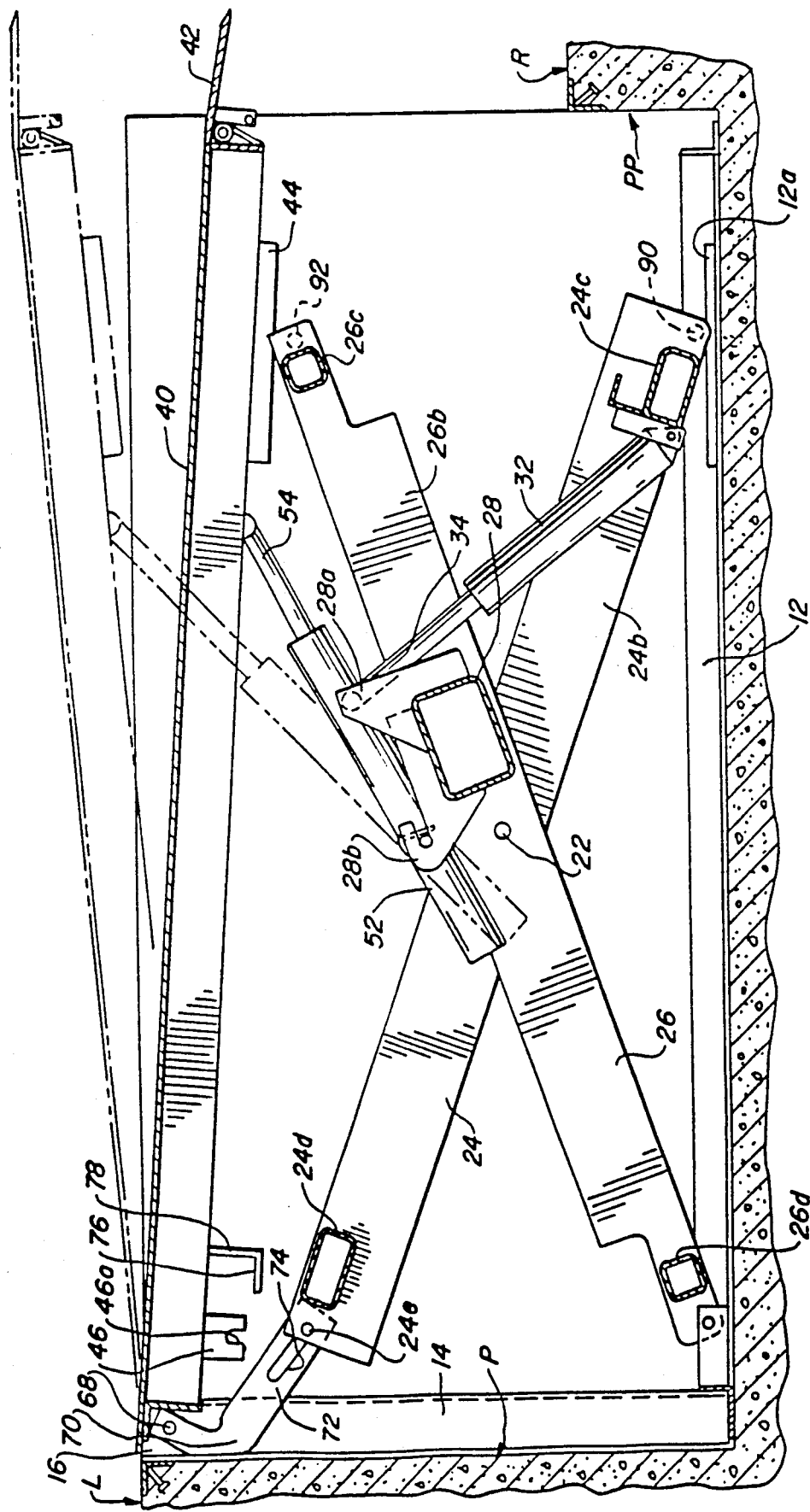
FIG. 4 is similar to FIG. 2 but showing the first means lowered to a predetermined intermediate position after a second means has pivotally attached the rear edge portion of the deck to an upright rear portion of the frame; the loading deck is shown in full lines in a lowered declining position below dock level, and, in phantom lines, in an upwardly inclined above dock level position.

The loading deck or platform 40 has an extension lip 42 hingedly connected to the front edge portion of the deck. The lip 42 is moveable from a stored, depending position as shown in FIG. 1, to an extended cantilevered position as shown in FIGS. 2-4. The lip 42 is of conventional design and is used to bridge the gap between the front edge of deck 40 and the rear of the bed of a vehicle, not shown, parked on the roadway adjacent the dock front wall and also to span the gap between the deck front edge and the pit wall PP formed in the roadway R, as shown in FIG. 3. The various mechanisms for affecting pivotal movement of the lip are known to those skilled in the art and a description thereof is omitted as such mechanisms form no part of the invention herein disclosed.

The loading deck 40 is releasably mounted on the scissor-acting assembly 20 and in response to expansion and contraction of the scissor-acting assembly 20 moves between a lowered horizontal position substantially coplanar with the roadway R, as shown in FIG. 3, and a raised horizontal position substantially coplanar with the loading dock platform surface L, as shown in FIGS. 1 and 2. Rollers 92 are disposed on the front ends of the second framework side members 26a and 26b and slide along the undersurface of a pair of guides 44, the latter being affixed to the underside of the deck 40. The rollers 92 support the front portion of deck 40 as the scissor-acting assembly 20 raises and lowers the deck. The front portion of the deck may be raised off the assembly 20 since the framework 26 is not permanently attached to the deck 40.

In accordance with the present invention, the rear portion of the deck is releasably mounted on the scissor-acting assembly 20 and allows the assembly 20 to be lowered beoow the underside of the deck thereby permitting pivotal movement of the deck 40 to a lowered declining position. The rear end of each side member 24a and 24b of the first framework includes a rod 24e bracketed by a right angle piece 24f. A pair of depending bracket members 46 is fixedly mounted on a rear portion of the deck 40. The lower distal end of each bracket member 46 is bifurcated thereby providing a downwardly open recess 46a which allows the rod 24e to be straddled by the distal end of each member 46 and thus support the rear portion of the deck as the scissor-acting assembly 20 raises and lowers the deck between the positions shown in FIGS. 2 and 3, while also leaving the rod 24e free to be lowered away from the bracket member 46, as illustrated in FIG. 4.

As seen in FIGS. 2 and 4, a second actuating means, such as a hydraulic cylinder and piston mechanism 50, is mounted on the scissor-acting assembly 20 for affecting pivotal movement of the deck 40 between an upwardly inclined position above dock level and a lowered declining position below dock level. The mechanism 50 includes a hydraulic cylinder 52 which is pivotally mounted on a bracket 28b affixed to the cross-frame member 28 of the second framework 26 and a piston 54 the exposed distal end of which is pivotally connected to the underside of the deck 40. Extension and retraction of the piston raises and lowers the front portion of the deck.

FIGS. 5 and 6 illustrate a second means, such as a hydraulically actuated apparatus 60, disposed proximate the rear edge portion of the deck for releasably retaining the deck rear edge portion in pivotal attachment to an elevated rear portion 16 the frame. The apparatus 60 is mounted on and extends along a deck cross-frame member 48 which is proximate the rear edge of the deck. The apparatus 60 includes a centrally located hydraulic cylinder 62, and a piston 64 extending from one side of the cylinder. The piston is provided with an axially aligned extension rod 66. A hinge pin 68 is attached to and extends endwise of the extension rod 66. The extension rod 66 passes through and is supported by a lug 48a affixed to and projecting from cross-frame member 48 while the hinge pin passes through and is supported by a laterally spaced second lug 48b. A second extension rod 67 is attached to and axially aligned with the cylinder 62. A second hinge pin 68 is attached to and extends endwise of the second extension rod 67. The second extension rod 67 and its corresponding hinge pin 68 each pass through and are supported by laterally spaced lugs, not shown, affixed to and projecting from member 48 in a like manner. Extension of the piston 64 successively drives the hinge pins 68 outwardly into bore holes formed in the elevated portion 16 of the frame rear section. Retraction of the piston 64 successively pulls the hinge pins 68 inwardly and out of the bore holes formed in the elevated portion 16 of the frame rear section.

The second means need not be carried by the deck 40 as described, but instead retractable hinge pins may be disposed within the elevated rear portion of the frame and be adapted to extend into sockets disposed along the rear edge portion of the deck.

Having observed the details of the embodiment described, it will be noted that the assembly provides a loading deck adjustable to raised and lowered angular positions relative to the dock platform surface when in a leveler mode, and to horizontal lift and descent positions when in a lift mode. The assembly can be used in a lift mode to transport personnel and material handling equipment between the dock platform surface L and any vehicles with extremely low beds or onto the roadway R by operating the pair of hydraulic cylinders and piston mechanisms 30 effecting expansion and contraction of the scissor-acting assembly 20.

The assembly may also be used in a leveler mode to accommodate vehciels having beds approxiamtely level with the dock platform surface. When in such a mode the loading deck is at a level substantially coplanar with the dock platform surface, whereupon the hydraulically actuated mechanism 60 attached to the deck is activated driving the hinge pins 68 outwardly into pivotal engagement with the elevated rear portion 16 of the frame. After the rear edge portion of the deck is so attached, the scissor-acting assembly 20 is lowered to a predetermined intermediate position, as illustrated in FIG. 4. The hydraulic cylinder and piston mechanism 50 is then activated to raise or lower the deck between an upwardly inclined position and a lowered declining position as depicted in FIG. 4. Extension of the lip 42 to its cantilevered position allows personnel and material handling equipment to safely move in and out of a vehicle parked adjacent the loading dock front wall. It will be appreciated that this pivotal attachment of the rear edge portion of the deck coupled with the lowering of the scissor-acting assembly out of direct contact with the underside of the deck permits movement of the deck to the lowered declining position.

It should also be noted that movement of the deck to an upwardly inclined position does not require pivotal attachment of the rear edge portion of the deck to the elevated rear portion of the frame. A second pivot axis for the deck is provided as the bracket members 46 depending from the rear portion of the deck are supported on the rods 24e disposed on the rear ends of the first framework side members 24a and 24b. Thus, the front portion of the deck may be raised above the rollers 92 attached to the front ends of the second framework side members 26a and 26b by extension of the hydraulic cylinder and piston mechanism 50 while the rear portion of the deck pivots about the axis provided by rods 24e. This feature allows the lip 42 to be raised upwardly while in a depending position and then extended to a cantilevered position so as to clear the back of any vehicle parked adjacent the loading dock prior to use of the illustrated assembly in a lift mode even when the rear edge portion of the deck 40 is not pivotally attached to the frame.

When the assembly 20 is operated in a lift mode, an excessive heavy load placed on the front edge portion of the deck 40 may tend to force the bracket members 46 upwardly off the rod 24e, since the rollers 92 in such a situation would act as a fulcrum point unless a safety means is provided to stabilize the deck on the first means. Such a safety means may include a pair of dog-leg shaped members 70 each having one end portion thereof affixed to the hinge pin 68. The opposite end portion 72 of each member 70 is provided with an elongate slot 74. The rod 24e on each of the first framework side members 24a and 24b extends through and is in sliding engagement with the corresponding member slot 74. When the hinge pin 68 is retracted out of pivotal engagement with the elevated rear portion of the frame, the end portion 72 of member 70 is disposed over a ledge section 76 formed by an angle plate 78 depending from the underside of the deck 40 and while in such a relative position, the bracket member 46 cannot be raised off of the corresponding rod 24e since the ledge section 76 prevents the dog-leg member 70 from rotating downwardly. The relative location of the dog-leg member 70 and angle plate 78 is such that the scissor-acting assembly 20 may be lowered away from the bracket member 46 when the hydraulic assembly 60 is activated to pivotally attach the deck to the frame. Thus, driving the hinge pin 68 outwardly into the hole in the elevated rear portion 16 of the frame moves the dog-leg member 70 outwardly away from the ledge section 76. Once member 70 is no longer above the ledge section 76, the member 70 may be rotated downwardly to release rod 24e from supporting bracket member 46.

When not in use, the assembly may be placed in a stored position, wherein the loading deck 40 is substantially coplanar with the loading dock platform surface L, and the lip plate 42 is in a depending position. In the stored position, loading dock personnel and equipment can safely move across the dock platform surface because the deck closes the open top of the pit. From the stored position, personnel may select a lift mode or a leveler mode of operation. Such selection is determined by the type of loading and unloading operations to be accomplished. The selection can be made by operating switches provided on a suitable control panel located adjacent the loading station in question or centrally located as to all the stations provided in the loading dock. The switches activate the pair of hydraulic cylinder and piston mechanisms 30 and 50 and the hydraulic apparatus 60.

As aforementioned, when in the lift mode, the assembly is operated to transfer materials between the loading dock platform surface L and a low bed vehicle or the roadway R. When activated in the lift mode, the deck without personnel, handling equipment, or a load of material thereon is pivotally raised to an upwardly inclined position and the lip 42 is extended to the cantilevered position. The deck and extended lip is lowered as a unit to a horizontal position level with the dock platform surface L. Material handling equipment, such as a fork-lift, may then be moved onto the deck whereupon the deck and fork-lift are lowered to a desired level such as the level of the vehicle bed or the roadway R while maintaining the deck in a horizontal position. Since the lip is in a cantilevered position, the fork-lift may enter the vehicle or move onto the roadway. After the fork-lift has returned to the deck, the latter is raised back to a position substantially coplanar with the dock platform surface L thereby allowing the fork-truck to move onto the dock. The steps of lowering and raising the deck while the lip plate is extended may be repeated as necessary. After loading or unloading operations are finished the assembly is returned to the stored position.

In the lift mode, the assembly can also be operated to perform end load placement/retrieval with low bed vehicles. End load placement or retrieval becomes necessary when material must be loaded onto or unloaded from the extreme rear of the vehicle bed and the placement of the material interferes with the use of the lip in an extended cantilevered position. In such circumstances, the assembly may be operated in the lift mode by moving a fork-lift truck onto the deck 40 from the loading dock surface L. The deck is then lowered in a horizontal position to the level of the low bed vehicle. After the rear of the vehicle bed has been loaded or unloaded, the deck 40 is raised to the stored position to allow the fork-lift to move onto the dock platform surface L. These steps may be repeated as necessary.

Upon selection of the leveler mode, the assembly is operated to load and unload vehicles having beds approximately level with the loading dock surface L. In such a mode the rear edge portion of the deck is pivotally and releasably attached to the elevated rear portion of the frame whereby the scissor-acting assembly 20 is lowered to a predetermined intermediate position allowing the deck to be pivoted downwardly if desired. Without personnel, equipment, or loads on the deck, the latter is pivoted to a raised inclined position and the lip 42 is extended to a cantilevered position. The deck is then pivoted downwardly to a desired position depending on the height of the vehicle bed until the lip rests on the bed of the vehicle. It will be noted that the deck and extended lip can be pivotally moved to either an upwardly inclined position or a lowered declining position, as illustrated in FIG. 4. A fork lift may then move between the dock platform surface L and the vehicle bed across the deck 40 and the extended lip 42. After the loading or unloading operations are finished the assembly is returned to the stored position.

The assembly, if desired, can also perform below dock level end load placement or retrieval while in the leveler mode. While in such a mode and after the rear edge portion of the deck has been pivotally and releasably attached to the elevated rear portion 16 of the frame, the scissor-acting assembly 20 is lowered to the a predetermined intermediate position, whereupon the deck is lowered to a desired angular position without extending the lip plate 42 to a cantilevered position.

It will be apparent that the deck 40 with the lip plate 42 extended to a cantilevered position may automatically accommodate the float of the vehicle bed as the vehicle is being loaded or unloaded.

The assembly may also be operated to provide for additional safety for loading dock personnel and equipment by preventing the deck 40 from being left in a lowered position below the platform surface L of the dock after being used in the lift mode, and thus provide a situation in which personnel or equipment may fall into the open top pit. The additional safety is accomplished by the deck automatically returning to the aforedescribed stored condition after a selected interval of non-operation in the lift mode. For example, if the assembly is operated in the lift mode and the deck is left in a lowered below dock level position for more than fifteen minutes, the scissor-acting assembly 20 will be automatically activated raising the deck to its normal raised stored position.

Thus, an improved dock leveler and lift assembly and method of operating same have been disclosed for facilitating a variety of loading and unloading operations from a loading dock.

What is claimed is:

1. A dock leveler lift assembly for facilitating loading and unloading operations from a substantially horizontal platform surface of a loading dock, said assembly comprising:

a frame having a base section, and a rear elevated portion adapted to be disposed adjacent to but beneath the platform surface;

a first means mountable on the base section and selectively movable between a predetermined lowered position, a predetermined elevated position, and a plurality of intermediate positions;

a first actuating means connected to the first means for selectively raising and lowering same;

a deck releasably mountable on said first means and movable therewith to a selected position, one of said positions of said first means effecting a substantially coplanar relation of said deck to said platform surface;

a lip hingedly connected to a front edge portion of the deck and movable relative thereto between a depending position and an outwardly extended cantilevered position;

a second means disposed proximate a rear edge portion of the deck and being movable between operative and inoperative modes, when in an operative mode said second means releasably retaining the deck rear edge portion in pivotally attached relation with the frame rear elevated portion;

a third means movable between operative and inoperative modes, disposed proximate said second means and in cooperative realtion therewith, and adapted when in the operative mode to releasably retain the deck rear edge portion in pivotal engagement with said first means enabling said deck to assume an upwardly inclined position;

when said third means is in said inoperative mode said second means is in said operative mode whereby movement of the first means to one of said intermediate positions allows pivotal movement of said deck to a lowered declining position.

2. A dock leveler lift assembly for facilitating loading and unlaoding operations form a substantially horizontal platform surface of a loading dock, said assembly comprising:

a frame having a base seaction, rear support means adapted to be disposed adjacent to but beneath the platform surface;

first means mountable on the base section and selectively movable between a predetermined lowered position, a predetermined elevated position, and at least one intermediate position;

first actuating means connectedf to the first means for raising and lowering same;

a deck releasably mountable on said first means and movable between a lowered position, a raised position, adn at least one intermediate position, one of said positions being substantially coplanar with the platform surface;

a lip hingedly connected to a front portion of the deck and movable between a depending postion and an outwardly extended cantilevered position;

second means mountable on said rear support means proximate a rear portion of said deck and releasably retaining the deck rear portion pivotally attached to the rear support means;

second actuating means mounted on said first means having a distal end opeatively connected to the deck for affecting pivotal movement thereof between an upwardly inclined position and lowered declining position;

whereby the lowering of the first means to an intermediate position allows pivotal movement of said deck to the lowered declining position when the second means has pivotally attached the rear portion of the deck to the rear support means.

3. The dock leveler lift assembly of claim 2 wherein said second means comprises hinge pins mounted for transverse movement on said rear support means and sockets disposed along the rear portion of said deck for slidingly receiving said hinge pins.

4. The dock leveler lift assembly of claim 2 wherein said rear support means being independent of said frame base.

5. A dock leveler lift assembly for facilitating loading and unloading operations from a substantially horizontal platform surface of a loading dock, said assembly comprising:

a frame having a base section, rear support means having an upper end portion adapted to be disposed adjacent to but beneath the platform surface;

first means mountable on said base section and selectively movable between a predetermined lowered postion, a predetermined elevated position, and at least one intermediate position;

first actuating means connected to the first means for selectively raising and lowering same;

a deck releasably mountable on said first means and movable therewith to a selected position, one of said positions of said first means effecting a substantially coplanar relation of said deck to the platform surface;

a lip hingedly connected to a front portion of the deck and movable relative thereto between a depending position and an outwardly extended cantilevered position;

second means disposed proximate a rear portion of the deck and being movable between operative and inoperative modes, when in an operative mode said second means releasably retaining the deck rear portion in pivotally attached relation with said rear support means upper end portion;

third means movable between operative and inoperative modes, disposed proximate said second means and in cooperative relation therewith, and adapted when in the operative mode to releasably retain the deck rear portion in pivotal engagement with said first means enabling said deck to assume an upwardly inclined position;

when said third means is in said inoperative mode said second means is in said operative mode whereby movement of said first means to an intermediate position allows pivotal movement of said deck to a lowered declining position.

6. The dock leveler lift assembly of claim 5 further comprising safety means for automatically raising said first means to a substantially coplanar relation with the platform surface after a predetermined interval of non-operation of said first actuating means.

* * * * *

UNITED STATES PATENT AND TRADEMARK OFFICE
CERTIFICATE OF CORRECTION

PATENT NO. : 5,111,546

DATED : May 12, 1992

INVENTOR(S) : Norbert Hahn, Franklin Wisconsin; Robert W. Naegeli, Edmond Oklahoma It is certified that error appears in the above-identified patent and that said Letters Patent is hereby corrected as shown below:

Column 1, line 28 add the letter "m" to the word "platfor";

Column 5, line 26 delete the word "beoow" and substitute therefor -- below --;

Column 6, line 33 delete the word "vehciels" and substitute therefor -- vehicles --; and Column 6, line 33 delete the word "approxiamtely" and substitute therefor -- approximately --.

Column 9, line 57 delete the word "seaction" and substitute therefor -- section --;

Column 9, line 62 delete the letter "f" at the end of the word "connected"; and

UNITED STATES PATENT AND TRADEMARK OFFICE
CERTIFICATE OF CORRECTION

PATENT NO. : 5,111,546

DATED : May 12, 1992

INVENTOR(S) : Norbert Hahn, Franklin Wisconsin; Robert W. Naegeli, Edmond Oklahoma It is certified that error appears in the above-identified patent and that said Letters Patent is hereby corrected as shown below:

Column 9, line 68 delete the word "adn" and substitute therefor -- and --.

Signed and Sealed this

Sixth Day of July, 1993

Attest:

MICHAEL K. KIRK

*Attesting Officer*  *Acting Commissioner of Patents and Trademarks*